June 16, 1936.  N. H. DURST  2,044,159
AUXILIARY CUTTER FOR LAWN MOWERS
Filed April 2, 1934
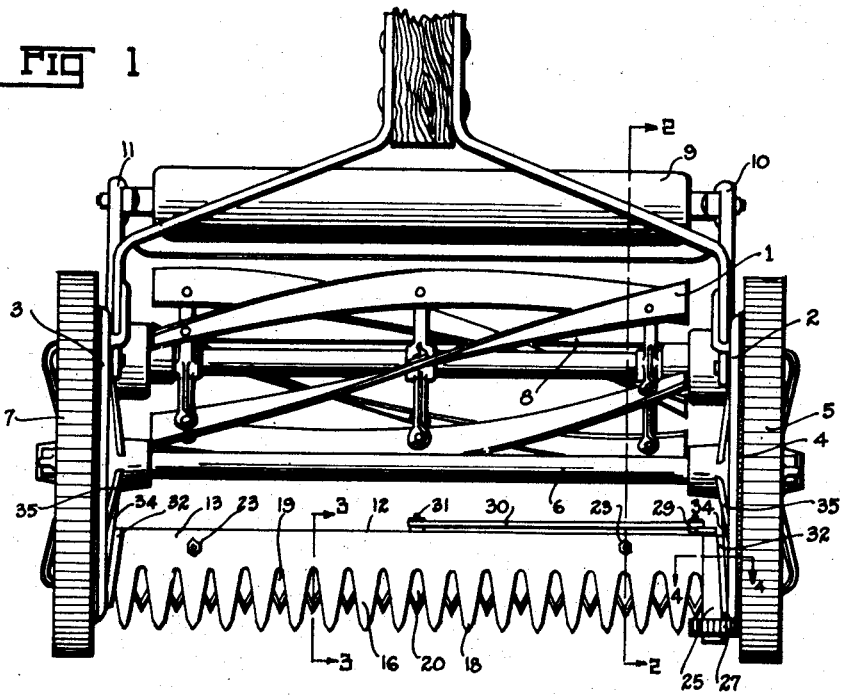
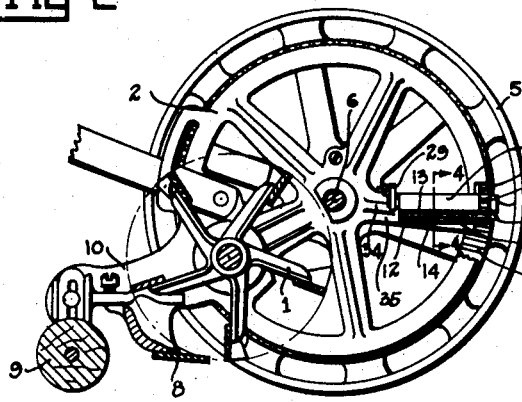
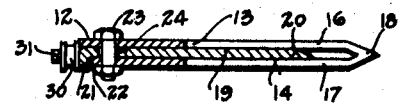
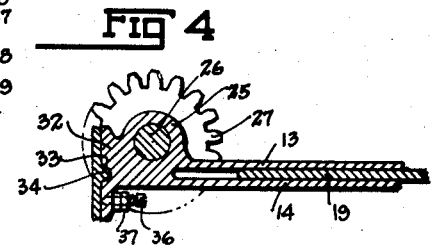
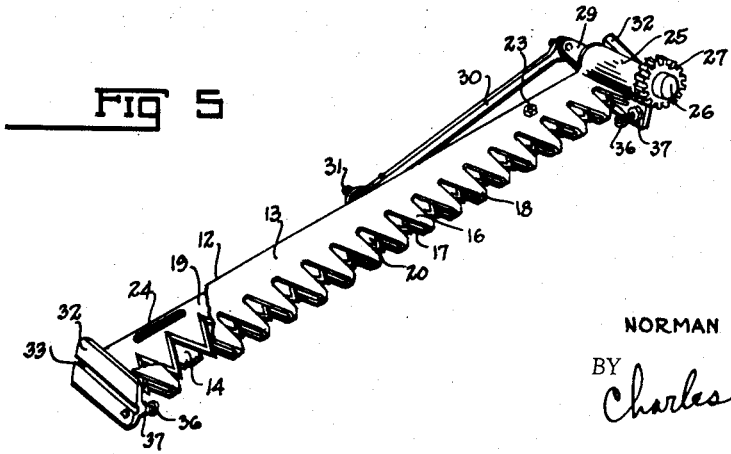
INVENTOR.
NORMAN H. DURST
BY *Charles R Werner*
ATTORNEY.

Patented June 16, 1936

2,044,159

UNITED STATES PATENT OFFICE 2,044,159

AUXILIARY CUTTER FOR LAWN MOWERS

Norman H. Durst, Moundridge, Kans.

Application April 2, 1934, Serial No. 718,636

2 Claims. (Cl. 56—238)

This invention relates to lawnmowers and particularly to an auxiliary cutter adapted to be removably mounted thereon. The object of the invention is to provide an easily removable attachment having certain novel features whereby tall grass, weeds and other foreign growth will be effectively cut in advance of the regular cutter on the mower.

It is also the object of the invention to provide an efficient, inexpensive and easily manufactured cutting attachment and position the same on the lawnmower so that there will be little or no danger of the cutting blades contacting foreign objects with attendant damaging results. A further object of the invention is to provide a shearing or cutting unit which will have a positive shearing action and will not be sprung under abnormal cutting conditions.

The following description in conjunction with the accompanying drawing will clearly illustrate the novel construction and operation of the invention. The reference numerals in the specification correspond with similar numerals in the drawing, in which:

Figure 1 is a top plan view of a lawnmower showing the auxiliary cutter applied.

Figure 2 is a sectional view on the line 2—2 of Figure 1.

Figure 3 is a sectional view through the cutting blades on the line 3—3 of Figure 1.

Figure 4 is a sectional view on the line 4—4 of Figure 2.

Figure 5 is a perspective view of the assembled cutter ready for attachment to the lawnmower.

The general construction of lawnmowers being old and well understood, the common parts thereof will not be specifically described herein although reference numerals will be given them to better describe the manner of attachment and operation of the auxiliary cutter comprising the invention.

The rotary cutter 1, journaled in side frames 2 and 3 is motivated by gear teeth 4 on the traction wheel 5, rotatably mounted on shaft 6 also carrying traction wheel 7. The straight cutting blade 8 adjustably mounted to side plates 2 and 3 coacts with rotary cutter 1 to perform the cutting action. Roller 9 is adjustably carried in extensions 10 and 11 of the side frames 2 and 3.

The auxiliary cutter consists of a horizontally disposed, transverse cutting unit 12 with upper and lower blade portions 13 and 14 having spaced teeth 16 and 17 united at their forward points as shown at 18. A longitudinally reciprocable cutting blade 19 is slidably carried between and in close contact with the blade portions 13 and 14 and also has spaced teeth 20. At the rear of blade 19 is a depending flange 21 bearing against rear edge 22 of lower blade portion 14, providing a longitudinal guide for the reciprocal movement of blade 19. Bolts 23 pass through blade 13, elongated slots 24 in blade 19 and through blade 14, providing retaining means for the reciprocating blade 19.

At one end of member 12 is a bearing 25 in which is rotatably mounted shaft 26 to the outer end of which is secured a gear 27 meshing with gear teeth 4 on tractor wheel 5 through aperture 28 in end frame 2. The other end of shaft 26 carries a crank lever 29 pivotally supporting a connecting rod 30 the other end of which is pivoted to pin 31 intermediate the ends of and integral with the cutting blade 19 and retained thereon by suitable means. Flanges 32 at the ends of blade 19 have grooves 33, corresponding with ridges or ribs 34 on spokes 35 of end frames 2 and 3. Set screws 36 and lock nuts 37 are provided for securely locking the auxiliary cutter in operating position.

From the foregoing it will be apparent that the operation of mounting the auxiliary cutting attachment is very simple, it being only a matter of sliding the grooved flanges 32 in position on the ribbed spokes 35 until gear 27 meshes with gear teeth 4 on tractor wheel 5, tightening set screws 36 and locking them with nuts 37.

To operate the auxiliary cutter the lawnmower is pushed forward in the usual manner. Movement of the traction wheel 5 actuates gear 27, crank lever 29, connecting rod 30 and movable cutting blade 19, which, in conjunction with upper and lower blades 13 and 14 severs the tall grass, weeds and the like at a heighth where the ordinary rotary cutter can effectively mow the balance of the growth.

The novel cutting unit 12 as herein applied to a lawnmower is particularly effective in overcoming strains incident to the shearing process of heavy grass, weeds and other growth. As described and illustrated the cutting unit 12 with its upper blade 13, lower blade 14 and intermediate reciprocating blade 19 forms a compact, positive acting and highly efficient cutter. Obviously slight changes in form, proportion and details of construction may be resorted to without departing from the spirit of the invention and all rights to such reasonable changes as may come within the scope of this invention are hereby reserved.

What I claim as new and desire to secure by Letters Patent is:

1. An attachment for lawnmowers comprising an auxiliary, transverse cutter capable of being mounted between and being secured to the end frames of a lawnmower, said cutter comprising a fixed cutting blade and a longitudinally reciprocable cutting blade, means for reciprocating the second mentioned blade, said means comprising a bearing on the fixed cutting blade, a shaft rotatably mounted in the bearing, a gear on one end of the shaft and meshing with the gear teeth on one traction wheel of the lawnmower, a lever on the other end of the shaft and a connecting rod secured to the lever and to the second mentioned cutting blade.

2. An auxiliary cutter for lawnmowers comprising a fixed cutting blade and a cooperating movable cutting blade, a shaft journaled adjacent one end of the fixed cutting blade, a pinion gear fixed to said shaft and meshing with gear teeth on one of the traction wheels of the lawnmower, a crank lever affixed to the shaft, a connecting rod pivotally connected to the crank lever and to the movable cutting blade to cause a reciprocatory movement to be imparted to said movable cutting blade.

NORMAN H. DURST.